United States Patent [19]
Reid, Jr.

[11] 4,010,500
[45] Mar. 8, 1977

[54] MOORING TERMINAL

[75] Inventor: William R. Reid, Jr., Northridge, Calif.

[73] Assignee: Imodco, Inc., Los Angeles, Calif.

[22] Filed: Oct. 28, 1975

[21] Appl. No.: 625,862

[52] U.S. Cl. .................................. 9/8 P; 114/230; 141/387

[51] Int. Cl.² ........................................ B63B 21/00

[58] Field of Search ........................ 9/8 P; 114/230; 141/279, 387, 388; 137/236

[56] References Cited

UNITED STATES PATENTS

| | | | |
|---|---|---|---|
| 2,882,536 | 4/1959 | Jordan | 9/8 P |
| 3,155,069 | 11/1964 | Ross et al. | 114/230 |
| 3,572,408 | 3/1971 | Hnot | 114/230 |
| 3,783,816 | 1/1974 | de Chassy et al. | 9/8 P |

Primary Examiner—Trygve M. Blix
Assistant Examiner—Charles E. Frankfort
Attorney, Agent, or Firm—Lindenberg, Freilich, Wasserman, Rosen & Fernandez

[57] ABSTRACT

A mooring terminal for deep water mooring is provided having a mooring head to which ships can be attached while either receiving or unloading liquid products. The mooring head is constructed so that it can accommodate all motions of the ship and includes a pair of yoke arms carrying hoses external from the mooring head to the ship. The yoke arms are attached to the mooring head in a manner to be able to pivot about a horizontal axis. The mooring head is supported above a deck which can rotate about a vertical axis in a manner to be rotatable about an axis orthogonal to the axis about which the yoke arms rotate. A pipe extends through the tower and at the top is coupled to the hoses by means which are pivotable about the same axes as the mooring head.

7 Claims, 4 Drawing Figures

4,010,500

MOORING TERMINAL

BACKGROUND OF THE INVENTION

This invention relates to deep water mooring terminals and more particularly to improvements therein.

Because of the draft required for oil tankers nowadays, these tankers are moored with deep water mooring facility at some distance off-shore. These mooring facilities can comprise mooring buoys as well as mooring towers which are attached to the bottom of the ocean by means of a swivel joint. Provision is also made for pipes extending along the bottom of the ocean from stations on land, or from supply vessels, up to the mooring buoy or through the mooring tower from whence hoses extend to the tanker.

Heretofore a tanker would be moored to a buoy or a column by hawsers. However, one type of mooring which is presently coming into favor, is to use a V-shaped structure with a buoy which has the apex of the V attached to the buoy and a ship can then sail into the opening of the V, the arms of which have suitable arrangements thereon for coupling to the ship. Hoses normally used for carrying liquid cargo to or from the ship are replaced by pipes which are supported by the V arms and therefore can be readily coupled to the pipelines on the ship. This avoids the necessity for having a tug pickup the hoses and mooring lines from the ocean surface from which they otherwise are floated and carry them to the tanker. Another use for this type of mooring is to have a vessel permanently moored to the buoy. It supplies other ships with liquid cargo which it receives from the buoy.

The V-shaped mooring arrangement can swivel around the vertical axis of a buoy, but all other motions of the ship are communicated through the V-shaped mooring mechanism and are absorbed by moving the buoy.

In the case of the mooring columns, no V-shaped mooring mechanism has been provided. Mooring thereto is achieved by mooring hawsers. The reason apparently is that in view of the fact that the mooring column is a rigid structure, it would not be able to absorb the forces transmitted through a rigid mooring mechanism by the moored ship. A V-shaped mooring arrangement which can be used with a mooring column would provide advantages, such as ease of mooring, and would eliminate the need for hoses and hawsers which deteriorate and require replacement.

OBJECTS AND SUMMARY OF THE INVENTION

It is an object of this invention to provide a mooring head for a mooring column which enables the use of a V-shaped mooring structure.

It is another object of the present invention to provide a head for a mooring column which is movable, in response to all motions of a ship, transmitted thereto through a rigid mooring means.

Still another object of this invention is to provide a novel and useful mooring head for a rigid mooring column.

The foregoing and other objects of the invention are achieved by the provision of a V-shaped mooring mechanism which is coupled to a mooring head which has bearing arrangements such that the mooring head is rotatable in yaw, pitch and roll, and pipes coupled in a manner to still maintain fluid coupling between the pipes which run up through the column and extend to the ship.

DESCRIPTION OF THE PREFERRED EMBODIMENTS

Figure 1:
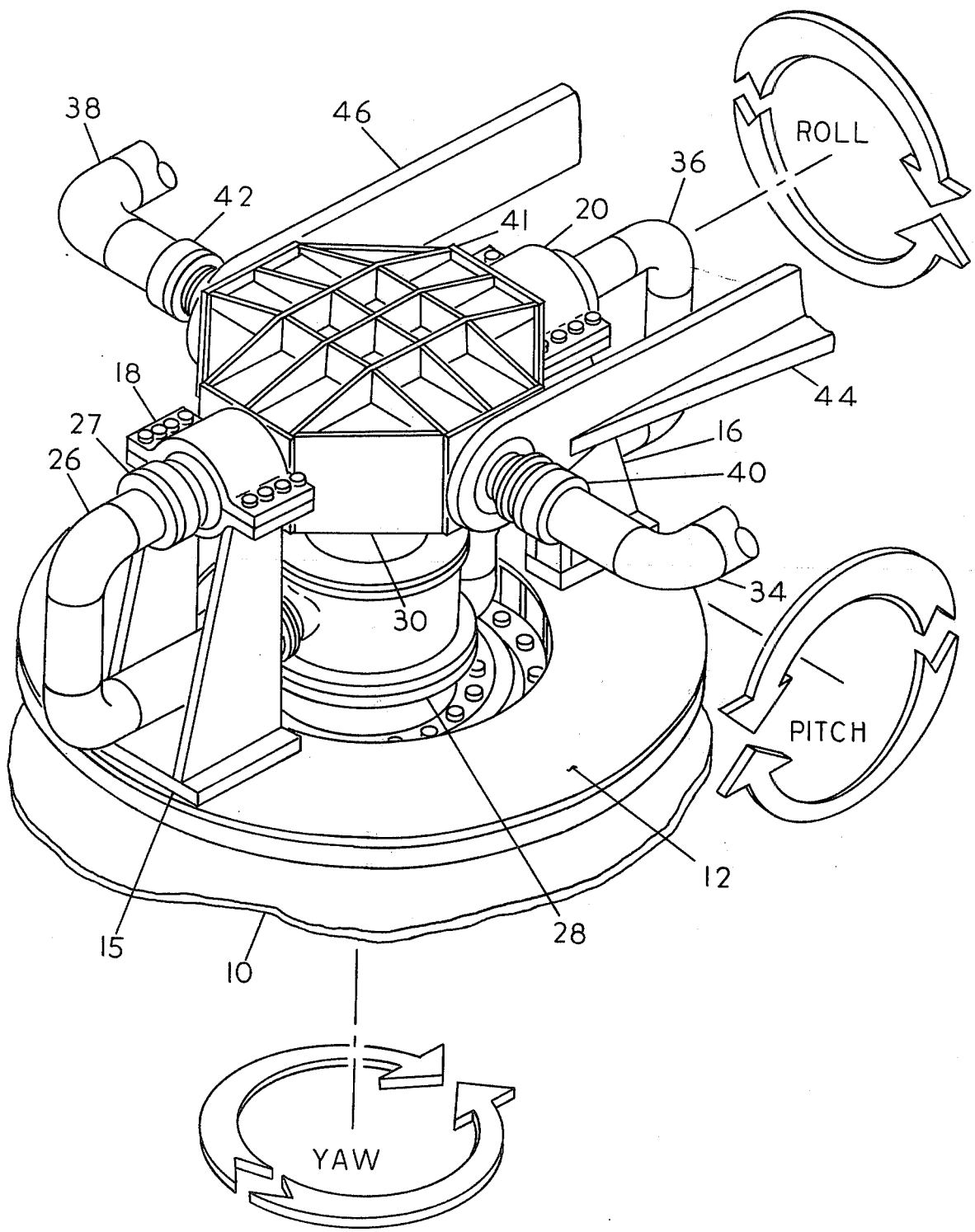
FIG. 1 is a perspective view of a mooring head in accordance with this invention.
Figure 2:
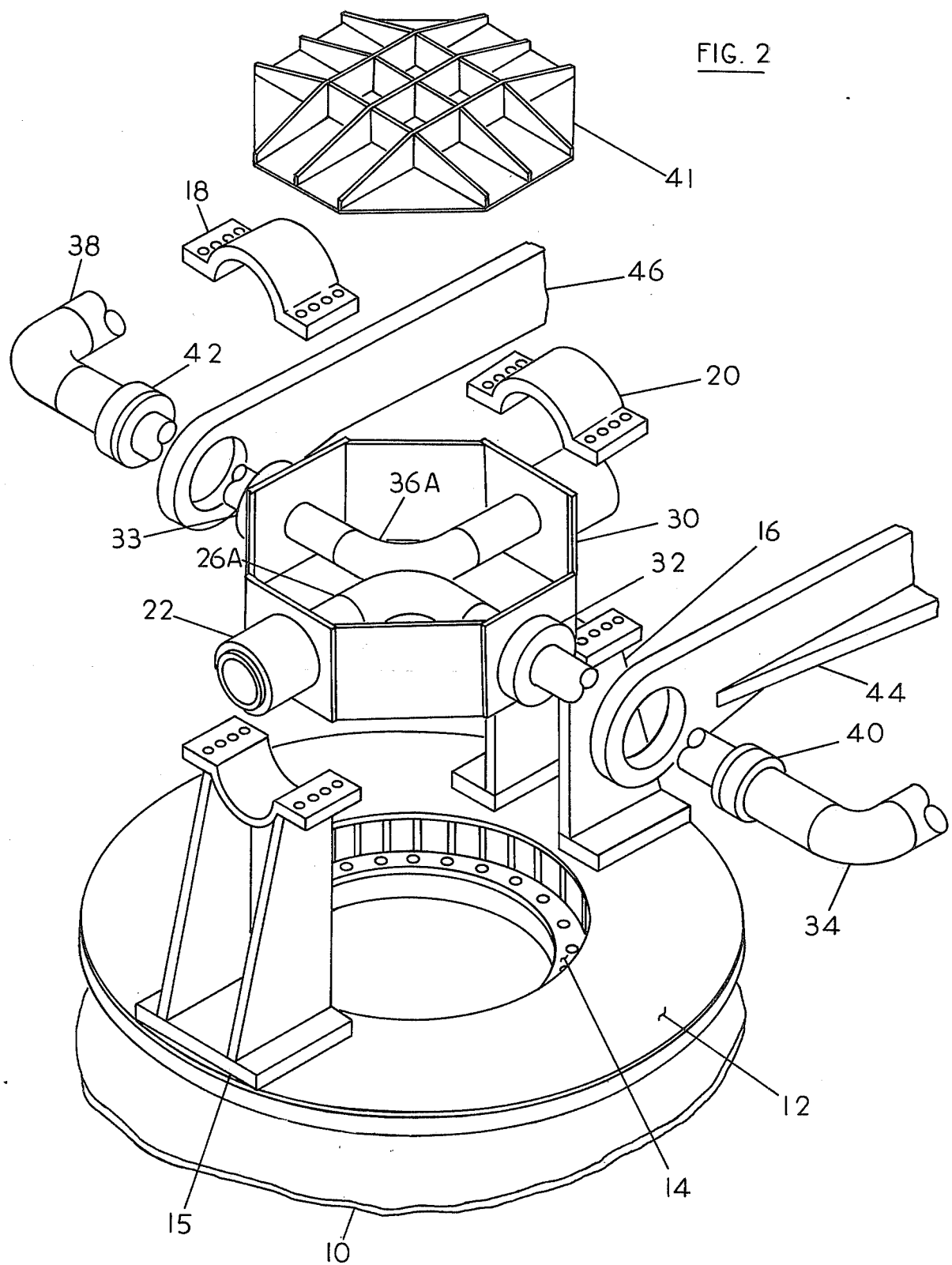
FIG. 2 is an exploded and perspective view illustrating the construction of the top and bottom of a mooring head in accordance with this invention.
Figure 3:
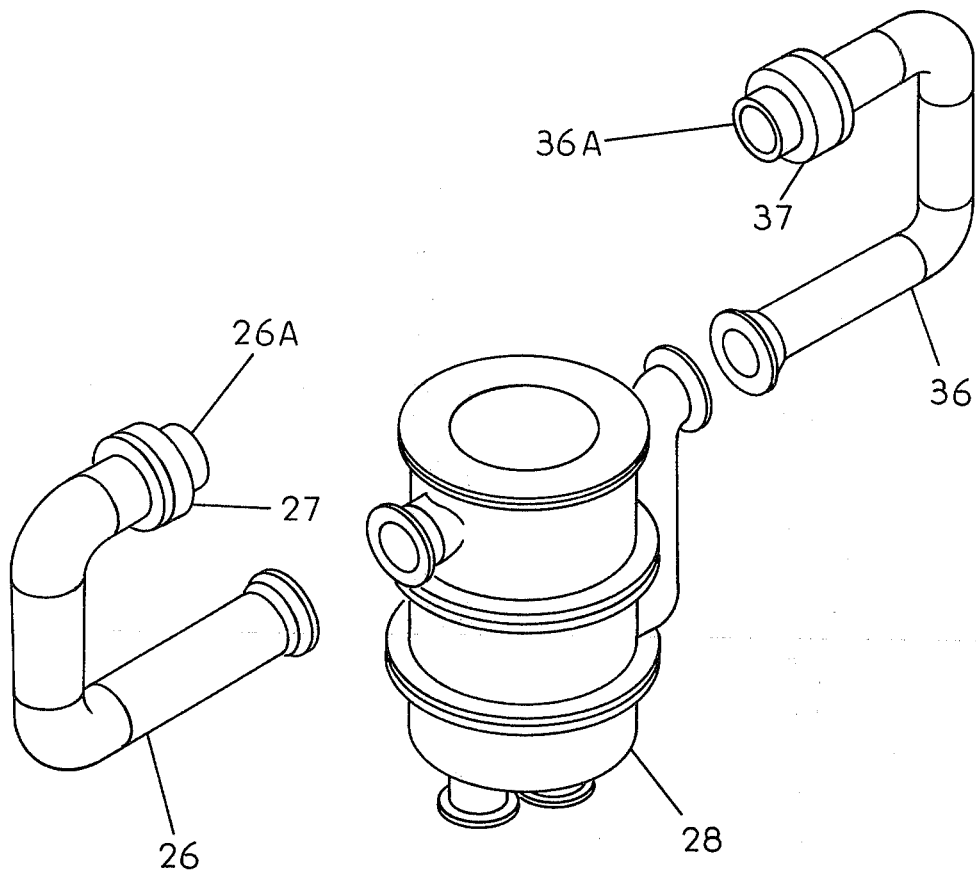
FIG. 3 is an exploded perspective view illustrating the central construction of a mooring head in accordance with this invention.

The following description will refer to FIGS. 1, 2 and 3, which respectively comprise a perspective view of the embodiment of the invention, and exploded perspective views showing the construction of the top and bottom, and the center of the embodiment of the invention.

The top deck 10 of a column or if desired, a mooring buoy, which is fragmentally shown in FIG. 1, supports a rotatable table 12 thereon. The rotatable table actually comprises a platform which encloses a bearing 14 which enables the table to be supported on the top deck of the tower or column and to rotate about the vertical axis of the column. A portion of the main bearing 14 upon which the rotating table rotates may be seen in FIG. 2.

There are two bearing pedestals respectively 15, 16, which are supported on the top deck 12. A bearing cap 18 is used to clamp a bearing 22, between it and the bearing pedestal 15. Another bearing cap 20 is used to clamp another bearing (not shown) to the bearing pedestal 16. These two bearings support a transfer box 30 therebetween.

A first connecting pipe 26, extends from a two-product swivel 28, through bearing 22 to a pipe 26A in the transfer box 30, and out through another bearing 32, to a pipe 34, which extends to the ship which is moored. Similarly, another connecting pipe 36, extends from the two-product swivel 28, through the bearing which is mounted oppositely to bearing 22 on the bearing pedestal 16, and then, through a pipe 36A in the transfer box 30 through another bearing, 33, finally coupling to a pipe 38, which extends to the ship. Both pipes 26 and 36 respectively couple to transfer pipes 26A and 36A through pipe swivels 27 and 37, respectively. Pipes 26A and 36A couple to pipes 34 and 38 through respective pipe swivels 40 and 42.

The top of the transfer box is covered by a cover plate 41. A V-shaped mooring structure is formed by two yoke arms respectively 44, 46, which are respectively fitted over bearings 32 and 33. With the construction shown, the transfer box so supported above the product swivel by bearings which enable it to move with the roll motion of a ship. The bearings to which the yoke mooring arms are attached, which are also attached to the transfer box enable pitch motions of the ship to be tolerated. Weather vaning of the ship is taken care of by the main bearing 14. The coupling of the pipes from the product swivel to the pipes 34, 38 extending to the ship provides the required motions of the interconnecting pipes to compensate for pitch and roll.

Figure 4:
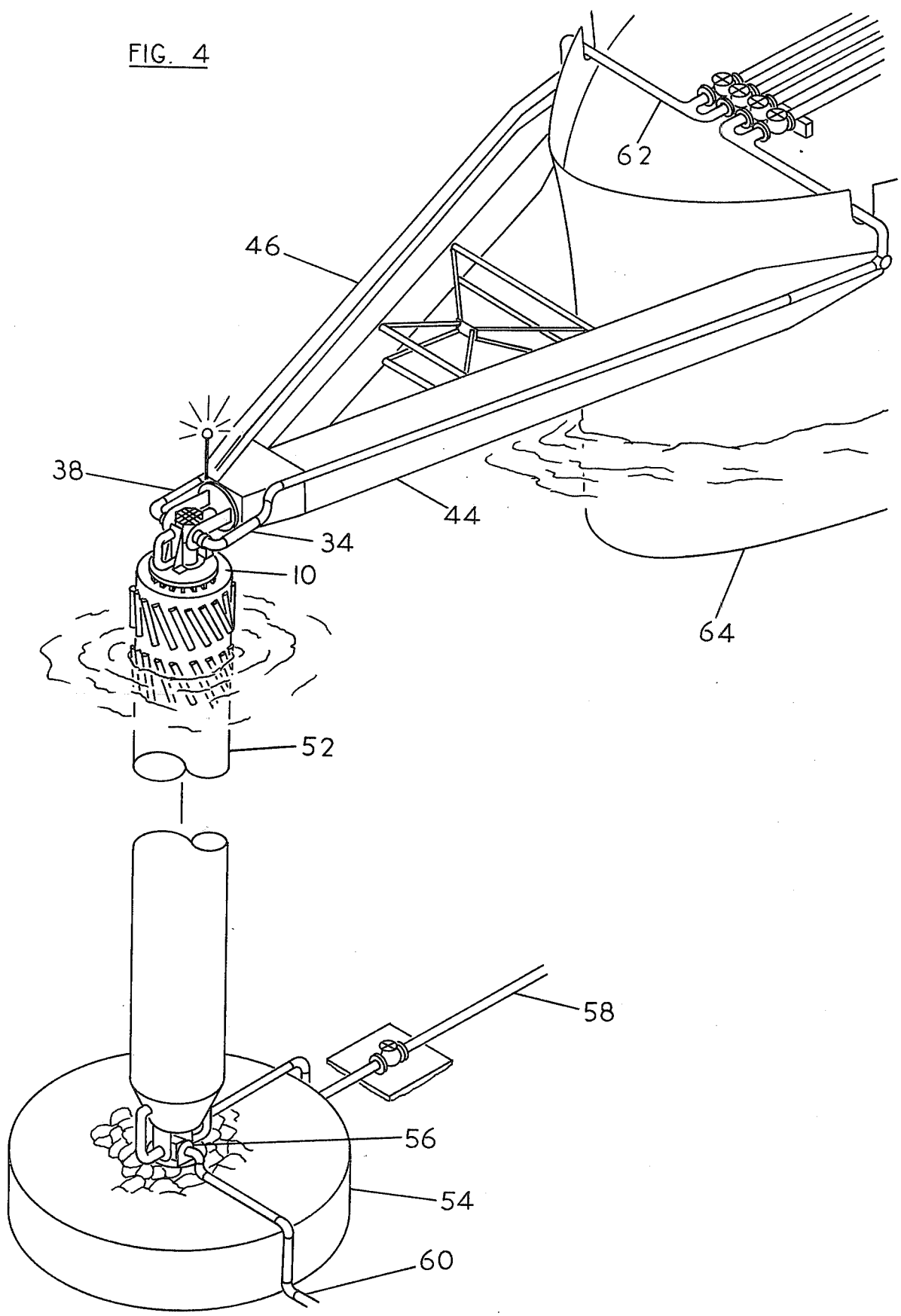
FIG. 4 is a perspective view illustrating the location and use of a mooring head in accordance with this invention.

FIG. 4 illustrates the tri-axial swivel mooring head 50, in position on top of a mooring column 52. The mooring column is anchored to a mooring base 54, by means of a base fluid swivel 56. Pipe lines respectively 58, 60, which extend along the bottom of the ocean, are coupled to a base fluid swivel 56. Within the columm, pipes, which are coupled to the pipes 58 and 60, extend to the top of the column to couple to the two-product swivel 28, shown in FIG. 3. A two-product swivel and a base fluid swivel are known structures and are commercially available. Accordingly they will not be described in detail here.

The two arms of the mooring yoke extend to a ship 64, and carry thereon the pipes 34, 38, which can then be coupled to pipes, such as 62, on the deck of the ship.

From the foregoing description, it should be apparent how the mooring head 50, in response to forces applied by a ship, through the mooring yokes can accommodate these forces while maintaining the ship mooring and while maintaining the coupling of the pipes.

There has accordingly been described and shown here and above a novel and useful construction for a mooring head for use on a mooring column, which maintains all required couplings despite the ship motion.

What is claimed is:

1. A system for mooring a ship to the top of a rigid column which is attached to and supported on the ocean floor and through which pipes extend to be connected to pipes on a ship moored thereto comprising
    a pair of yoke arms extending from the top of said column to a ship to be moored,
    mooring means connected between said pair of yoke arms and the top of said column including means at the top of said column for affording accommodation to the motion of a ship moored to said yoke arms about at least three orthogonal axes of rotation, and
    pipe means coupling the pipes extending through said column to said pipes on said ship, said pipe means including
    means for affording accommodation to the motion of said ship about the same three orthogonal axes of rotation as said mooring means.

2. A system for mooring a ship through the top of a tower extending to the bottom of the ocean comprising
    a deck,
    means for supporting said deck on the top of said tower for rotation about an axis extending through said tower,
    a first and second pedestal means positioned at opposite ends of a diagonal of said deck and attached to said deck, said first and second pedestal means extending upwardly away from said deck,
    a transfer box positioned between said first and second pedestal means,
    first bearing means for rotatably supporting said transfer box means from said oppositely positioned pedestal means about an axis which is orthogonal to the axis extending through said tower,
    a pair of mooring yoke arms extending from opposite sides of said transfer box means towards a ship to be moored, and
    a pair of second bearing means for pivotably attaching said mooring yoke arms to said transfer box for affording rotation of said yoke arms about an axis which is orthogonal to the axis of rotation of said transfer box provided by said first bearing means.

3. A system as recited in claim 2 wherein there are pipes extending through said tower for coupling to pipes on a moored ship, said system including
    pipe means coupled between the pipes extending through said tower and the pipes on said moored ship, said pipe means including swivel means for enabling said pipe means to accommodate to motion of said ship.

4. A system as recited in claim 3 wherein said pipe means includes
    connecting pipe means,
    product swivel means for coupling one end of said connecting pipe means to the end of said pipes extending through said tower, which end is at the top of said tower, while affording rotation to said connecting pipe means about the same axis as the one about which said deck means is supported for rotation,
    transfer pipe means each having one end swivelably connected to the other end of a different one of said connecting pipe means, and
    spanning pipe means for swivelably connecting each of said transfer pipe means to one of the pipe means on said ship.

5. A system as recited in claim 4 wherein one of said transfer pipe means extends from one of said spanning pipe means through one of said second bearing means, then through one of said first bearing means to a connecting pipe means,
    another of said transfer pipe means extends from the other of said spanning pipe means through another of said second bearing means, then through another of said first bearing means to another connecting pipe means.

6. A system for mooring a ship to the top of a mooring column through which pipes extend for coupling to a ship comprising
    deck means,
    first bearing means for supporting said deck means on top of said column for rotation about a longitudinal axis extending through said column,
    mooring means supported on said deck means for providing accommodation to the motion of a ship moored thereto,
    first pipe means extending from said mooring means to a ship,
    means for coupling said first pipe means extending to said ship to the pipes extending through said mooring column including
    a transfer pipe means for each first pipe means,
    means for coupling each transfer pipe means at one end to a different first pipe means for affording rotation therebetween about an axis which is orthogonal to an axis extending through said column,
    a coupling pipe means for each transfer pipe means,
    means for coupling the other end of each transfer pipe means to one end of a different coupling pipe means for affording rotation therebetween about an axis which is orthogonal to the axis of rotation between said first pipe means and said transfer pipe means,
    product swivel means supported on top of said column and extending through said deck means, and affording rotation to pipes coupled thereto about an axis extending through said column, and
    means coupling the other end of each coupling pipe means to said product swivel means.

7. A system as recited in claim 6 wherein said mooring means includes
- a pair of operatively extending pedestal means positioned at opposite ends of a diameter of said deck means,
- a second bearing means supported at the top of each of said pedestal means to afford rotation about an axis which is orthogonal to an axis extending through said column,
- transfer box means positioned between and attached to said second bearing means to be rotatable about said axis orthogaonal to an axis extending through said column,
- a pair of yoke arms extending from opposite sides of said transfer box towards a ship, and
- third bearing means for rotatably coupling said pair of yoke arms to opposite sides of said transfer box, said third pair of bearing means affording rotation of said yoke arms about an axis which is orthogonal to the axis of rotation afforded by said second bearing means.

* * * * *